(12) United States Patent
Gao et al.

(10) Patent No.: US 10,314,021 B2
(45) Date of Patent: Jun. 4, 2019

(54) METHOD FOR MAPPING CONTROL CHANNEL RESOURCES, BASE STATION, AND USER EQUIPMENT

(71) Applicant: Huawei Technologies Co., Ltd., Shenzhen, Guangdong (CN)

(72) Inventors: Chi Gao, Beijing (CN); Liang Xia, Shenzhen (CN); Mingyu Zhou, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/326,669

(22) Filed: Jul. 9, 2014

(65) Prior Publication Data

US 2014/0334408 A1 Nov. 13, 2014

Related U.S. Application Data

(63) Continuation of application No. PCT/CN2012/087503, filed on Dec. 26, 2012.

(30) Foreign Application Priority Data

Jan. 9, 2012 (CN) .......................... 2012 1 0004648
May 11, 2012 (CN) .......................... 2012 1 0146516

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0094* (2013.01)

(58) Field of Classification Search
None
See application file for complete search history.

(56) References Cited

U.S. PATENT DOCUMENTS 9,144,070 B2 * 9/2015 Yang ...................... H04L 5/001
2009/0303956 A1 * 12/2009 Chen ..................... H04L 1/1607
370/329

(Continued)

FOREIGN PATENT DOCUMENTS

CN 101374283 A 2/2009
CN 102170703 A 8/2011

(Continued)

OTHER PUBLICATIONS

Intel Corporation, "Analysis of DCI Multiplexing in ePDCCH Design", Nov. 14-18, 2011; 3GPP TSG RAN WG1 Meeting #67, R1-113950, pp. 1-5.*

(Continued)

*Primary Examiner* — Robert C Scheibel

(57) ABSTRACT

Embodiments of the present invention provide a method for mapping control channel resources, a base station, and a user equipment. The method for mapping control channel resources includes: determining, by a base station, the number of E-CCEs multiplexed in one resource set, where the E-CCEs are borne over REs for transmission in the resource set, and the E-CCEs constitute an E-PDCCH; sending the E-PDCCH to a user equipment according to the determined number of E-CCEs multiplexed in one resource set; and receiving, by the user equipment, the E-PDCCH, and obtaining the number of E-CCEs multiplexed in one resource set. The embodiments of the present invention apply to a resource mapping.

15 Claims, 3 Drawing Sheets

(56) References Cited

U.S. PATENT DOCUMENTS

| | | | |
|---|---|---|---|
| 2011/0268062 A1* | 11/2011 | Ji | H04J 11/005 370/329 |
| 2011/0310829 A1* | 12/2011 | Ji | H04L 5/0037 370/329 |
| 2012/0320846 A1* | 12/2012 | Papasakellariou | H04W 72/042 370/329 |
| 2013/0039284 A1* | 2/2013 | Marinier | H04L 5/001 370/329 |
| 2013/0044692 A1* | 2/2013 | Nory | H04L 25/0228 370/329 |
| 2013/0044727 A1* | 2/2013 | Nory | H04L 5/0092 370/330 |
| 2013/0107822 A1* | 5/2013 | Papasakellariou | H04L 1/0045 370/329 |
| 2013/0114521 A1* | 5/2013 | Frenne | H04L 5/0053 370/329 |
| 2013/0114529 A1* | 5/2013 | Chen | H04L 5/0053 370/329 |
| 2013/0114530 A1* | 5/2013 | Chen | H04W 72/042 370/329 |
| 2013/0114565 A1* | 5/2013 | Chen | H04L 5/0053 370/330 |
| 2013/0148623 A1* | 6/2013 | Nishio | H04L 1/004 370/329 |
| 2013/0170449 A1* | 7/2013 | Chen | H04L 1/0038 370/329 |
| 2014/0056279 A1* | 2/2014 | Chen | H04W 52/04 370/330 |
| 2014/0211717 A1* | 7/2014 | Jitsukawa | H04L 5/0053 370/329 |
| 2014/0307560 A1* | 10/2014 | Kim | H04L 5/001 370/241 |
| 2014/0307700 A1* | 10/2014 | Seo | H04L 5/0053 370/329 |
| 2015/0085766 A1* | 3/2015 | Kim | H04L 5/0041 370/329 |

FOREIGN PATENT DOCUMENTS

| | | |
|---|---|---|
| CN | 102256358 A | 11/2011 |
| CN | 102420685 A | 4/2012 |
| CN | 102612094 A | 7/2012 |
| WO | WO 2009/041779 A1 | 4/2009 |

OTHER PUBLICATIONS

Samsung, "Resource multiplexing of E-PDCCH", Nov. 14-18, 2011; 3GPP TSG RAN WG1 #67, R1-114241, pp. 1-3.*

Love, et al, "Downlink Control Channel Design for 3GPP LTE", 2008, IEEE Comunications Society, pp. 813-818.*

"Resource multiplexing of E-PDCCH", Samsung, 3GPP TSG RAN WG1 #67, Nov. 14-18, 2011, 3 pages.

"Analysis of DCI Multiplexing in ePDCCH Design", Intel Corporation, 3GPP TSG WG1 Meeting #67, Nov. 14-18, 2011, 5 pages.

"Discussion on Downlink Control Channel Enhancement", Samsung, 3GPP TSG-RAN1#65 meeting, May 9-13, 2011, 4 pages.

"PDCCH Search Space Assignment Hashing Function", Motorola, 3GPP TSG RAN1 #52bis, Mar. 31-Apr. 4, 2008, 7 pages.

Robert Love, et al., "Downlink Control Channel Design for 3GPP LTE", Wireless Communications and Networking Conference, Mar. 31, 2008, p. 813-818.

"3rd Generation Partnership Project; Technical Specification Group Radio Access Network; Evolved Universal Terrestrial Radio Access (E-UTRA); Physical Channels and Modulation (Release 10)", 3GPP TS 36.211 v10.4.0, Dec. 2011, 101 pages.

* cited by examiner

Determine the number of E-CCEs multiplexed in one resource set, where the E-CCEs are borne over resource elements REs in the resource set for transmission, and the E-CCEs constitute an enhanced physical downlink control channel E-PDCCH    S501
Receive, according to the determined number of E-CCEs multiplexed in one resource set, the E-PDCCH sent by a base station    S502
FIG. 6
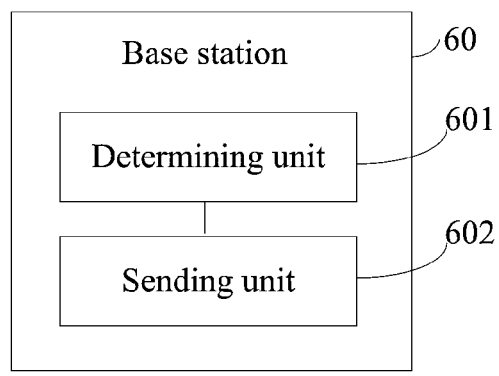
FIG. 7
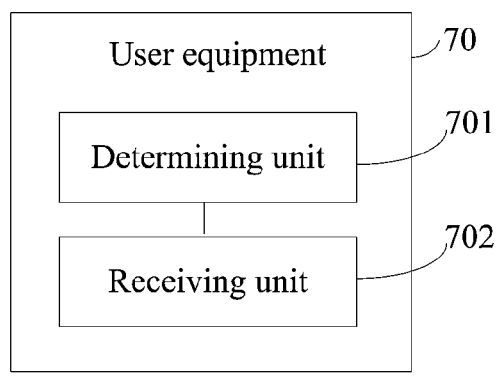
FIG. 8

METHOD FOR MAPPING CONTROL CHANNEL RESOURCES, BASE STATION, AND USER EQUIPMENT

CROSS-REFERENCE TO RELATED APPLICATIONS

This application is a continuation of International Application No. PCT/CN2012/087503, filed on Dec. 26, 2012, which claims priority to Chinese Patent Application No. 201210004648.7, filed on Jan. 9, 2012, and Chinese Patent Application No. 201210146516.8, filed on May 11, 2012, all of which are hereby incorporated by reference in their entireties.

TECHNICAL FIELD

The present invention relates to the field of communications, and in particular to a method for mapping control channel resources, a base station, and a user equipment.

BACKGROUND

In downlink transmission of a Long Term Evolution (Long Term Evolution, LTE for short) Rel-8/9/10 communications system, a base station, for example an eNB (evolved Node Base, evolved Node Base), sends a PDSCH (Physical Downlink Shared Channel, physical downlink shared channel) and a corresponding PDCCH (Physical Downlink Control Channel, physical downlink control channel) to each scheduled user equipment according to a scheduling result.

The PDSCH bears data sent by the eNB to the scheduled user equipment, and the PDCCH bears scheduling information of the corresponding PDSCH. The scheduling information is mainly used for indicating transmission format information to the corresponding PDSCH. The PDCCH and the PDSCH are time-division multiplexed in one subframe. The PDCCH is transmitted in the first several OFDM (Orthogonal Frequency Division Multiplexing, orthogonal frequency division multiplexing) symbols of the subframe, and the rest of OFDM symbols are used for transmitting the PDSCH. In a subframe, the PDCCHs of all scheduled user equipments are multiplexed together and then sent in a PDCCH area, and their PDSCHs are sent in a PDSCH area. Each PDCCH is comprised of 1/2/4/8 control channel elements (Control Channel Element, CCE), and the number of CCEs constituting each PDCCH is dependent on the size of the PDCCH and the channel of a user equipment corresponding to the PDCCH. The number of CCEs constituting the PDCCH may vary with different user equipments.

In a further evolution of the LTE Rel-10 system, MU-MIMO (Multiple User Multiple Input Multiple Output) and coordination among multiple cells need to be supported in order to improve the system performance, but these technologies lead to an increase in the number of user equipments that are scheduled at the same time. However, the limited capacity of the PDCCH limits the number of user equipments that can be scheduled in one subframe. Therefore, in the prior art, the PDCCH is enhanced; that is, a part of resources are divided from the original PDSCH area to transmit an enhanced PDCCH, that is, E-PDCCH (Enhanced Physical Downlink Control Channel). In this way, the capacity of the PDCCH and the number of user equipments that are scheduled at the same time can be increased. The E-PDCCH is comprised of E-CCEs (Enhance-Control Channel Element).

However, for LTE frequency-domain resources, resource scheduling is performed for the E-PDCCH in unit of RB pair (Resource Block pair). Each RB pair occupies 12 subcarriers in the frequency domain and occupies one subframe in the time domain. Resources available to the E-PDCCH are REs (Resource Element) in each RB pair except for those occupied by the PDCCH area and various reference signals. Therefore, the number of REs occupied by the E-PDCCH is significantly influenced by factors such as the system performance and actual transmission conditions, and it is difficult to ensure the number of REs occupied by each E-CCE constituting the E-PDCCH, resulting in unstable performance of E-CCEs and affecting the accuracy of reception by the user equipment.

SUMMARY

Embodiments of the present invention provide a method for mapping control channel resources, a base station, and a user equipment, which are capable of dynamically determining the number of E-CCEs multiplexed in a resource set so as to ensure stable performance of E-CCEs to further improve the accuracy of receiving an E-PDCCH by the user equipment.

To achieve the preceding objectives, the embodiments of the present invention adopt the following technical solutions:

According to one aspect, a method for mapping control channel resources is provided, including:

determining the number of enhanced control channel elements E-CCEs multiplexed in one resource set, where the E-CCEs are borne over resource elements REs for transmission in the resource set, and the E-CCEs constitute an enhanced physical downlink control channel E-PDCCH; and sending the E-PDCCH to a user equipment according to the determined number of E-CCEs multiplexed in one resource set.

According to one aspect, a method for mapping control channel resources is provided, including:

determining the number of E-CCEs multiplexed in one resource set, where the E-CCEs are borne over resource elements REs for transmission in the resource set, and the E-CCEs constitute an enhanced physical downlink control channel E-PDCCH; and receiving, according to the determined number of E-CCEs multiplexed in one resource set, the E-PDCCH sent by a base station.

According to another aspect, a base station is provided, including:

a determining unit, configured to determine the number of enhanced control channel elements E-CCEs multiplexed in one resource set, where the E-CCEs are borne over resource elements REs for transmission in the resource set, and the E-CCEs constitute an enhanced physical downlink control channel E-PDCCH; and a sending unit, configured to send the E-PDCCH to a user equipment according to the number of E-CCEs multiplexed in one resource set that is determined by the determining unit.

According to still another aspect, a user equipment is provided, including:

a determining unit, configured to determine the number of E-CCEs multiplexed in one resource set, where the E-CCEs are borne over resource elements REs for transmission in the resource set, and the E-CCEs constitute an enhanced physical downlink control channel E-PDCCH; and a receiving unit, configured to receive, according to the number of E-CCEs multiplexed in one resource set that is determined by the determining unit, the enhanced physical downlink control channel E-PDCCH sent by a base station.

According to the method for mapping control channel resources, the base station, and the user equipment that are provided in the embodiments of the present invention, the base station sends an E-PDCCH to the user equipment according to the determined number of E-CCEs multiplexed in one resource set, and the user equipment receives the E-PDCCH and obtains the number of E-CCEs multiplexed in one resource set according to the E-PDCCH. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

BRIEF DESCRIPTION OF THE DRAWINGS

The accompanying drawings required for describing the embodiments or the prior art are introduced below briefly to illustrate the technical solutions according to the embodiments of the present invention or in the prior art more clearly. Apparently, the accompanying drawings in the following descriptions merely show some of the embodiments of the present invention, and persons of ordinary skill in the art can obtain other drawings according to the accompanying drawings without creative efforts.

FIG. 6 is a schematic flowchart of still another method for mapping control channel resources according to an embodiment of the present invention;

FIG. 7 is a schematic structural diagram of a base station according to an embodiment of the present invention; and FIG. 8 is a schematic structural diagram of a user equipment according to an embodiment of the present invention.

DETAILED DESCRIPTION

The technical solutions according to the embodiments of the present invention will be clearly and completely described in the following with reference to the accompanying drawings in the embodiments of the present invention. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figures 1, 2:
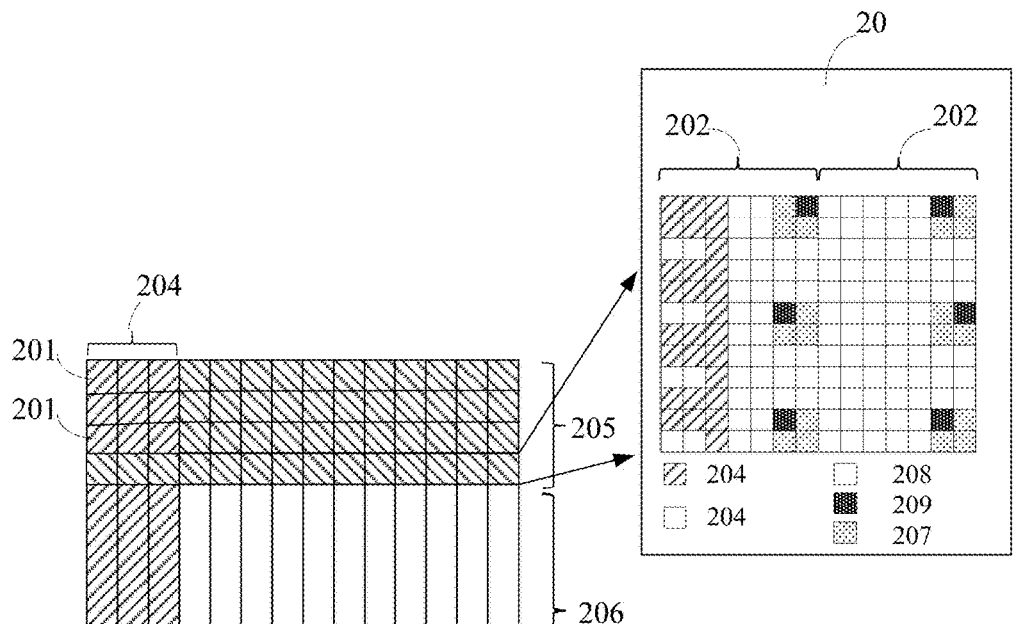
FIG. 1 is a schematic flowchart of a method for mapping control channel resources according to an embodiment of the present invention.
FIG. 2 is a schematic structural diagram of time-division multiplexing and frequency-division multiplexing of a resource set according to an embodiment of the present invention.

An embodiment of the present invention provides a method for mapping control channel resources. As shown in FIG. 1, the method includes the following steps:

S101: A base station determines the number of E-CCEs multiplexed in one resource set, where the E-CCEs are borne over resource elements REs for transmission in the resource set, and the E-CCEs constitute an E-PDCCH.

S102: Send the E-PDCCH to a user equipment according to the determined number of E-CCEs multiplexed in one resource set.

It should be noted that, this embodiment is described through an example where the resource set is a resource block RB pair, and because the number of E-CCEs multiplexed in one RB pair is fixed in the prior art, when a system configuration and/or an actual transmission condition changes, there is a great difference between the number of REs occupied by E-CCEs and the number of REs occupied by CCEs of a PDCCH, making it difficult to ensure the performance of E-CCEs. The system configuration and/or actual transmission condition may include at least one of: a subframe type, the number of OFDM symbols occupied by a PDCCH, various reference signal configurations, and the number of data transmission layers, all of which influence the number of remaining REs (Resource Element) capable of bearing E-CCEs.

The determining, according to a subframe type of a subframe where the E-PDCCH is located, the number of E-CCEs multiplexed in one resource set includes:

when a physical downlink control channel PDCCH and an enhanced physical downlink control channel E-PDCCH are sent to the user equipment, and the PDCCH and the E-PDCCH are multiplexed in one subframe:

determining, according to whether the subframe is a special subframe, an ordinary subframe, or an MBSFN subframe, the number of E-CCEs multiplexed in one resource set; or determining, according to whether the subframe is a time division duplex TDD subframe or a frequency division duplex FDD subframe, the number of E-CCEs multiplexed in one resource set.

When the base station dynamically sets the number of E-CCEs multiplexed in one RB pair according to different system configurations and/or actual transmission conditions, the above problem can be effectively solved. The number may be set based on a rule known to both the base station and the user equipment or may be set through negotiation during communication.

Exemplarily, for LTE (Long Term Evolution) frequency-domain resources, resource scheduling is performed for an E-PDCCH in unit of RB pair 20 as shown in FIG. 2, where the RB pair occupies 12 subcarriers 201 in the frequency domain and occupies one subframe in the time domain. An PDCCH, an E-PDCCH, and a PDSCH are time-division multiplexed in one subframe. Therefore when a general cyclic prefix subframe is used, the subframe has two timeslots (slot) 202 as shown in FIG. 2, and there are seven OFDM symbols 203 as shown in FIG. 2 in each timeslot. This embodiment is described through an example where the PDCCH occupies the first three OFDM symbols 203 in the first timeslot. Specific multiplexing of a PDCCH 204 as shown in FIG. 2, an E-PDCCH 205 as shown in FIG. 2, and a PDSCH 206 as shown in FIG. 2 is shown in FIG. 2. When the number of OFDM symbols occupied by the PDCCH 204 as shown in FIG. 2 is three, the number of REs occupied by a DMRS 207 as shown in FIG. 2 is 24, the number of REs occupied by a CRS 208 as shown in FIG. 2 is 16, the number of REs occupied by a CSI-RS 209 as shown in FIG. 2 is four, and the number of silent REs (Zero Power CSI-RS) 210 that do not send any signal so as to avoid interfering with a CSI-RS transmission position in a neighboring cell is 48, it can be seen that the number of available REs in an E-PDCCH area 205 is 40.

If a fixed number of E-CCEs, for example two, are used according to the prior art, the number of REs occupied by the E-CCEs is 20, which is far less than 36 REs occupied by CCEs in the PDCCH. If the number of E-CCEs is set to one according to the actual condition, the number of REs occupied by each E-CCE is 40, which is close to 36 REs occupied by CCEs in the PDCCH, so that stable performance of the E-CCEs can be ensured.

According to the method for mapping control channel resources provided in this embodiment of the present invention, a base station sends an E-PDCCH to a user equipment according to the determined number of E-CCEs multiplexed in one resource set. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

It should be noted that, the following embodiments are all described through an example where the resource set is a resource block pair RB pair, but the present invention is not limited thereto.

Figure 3:
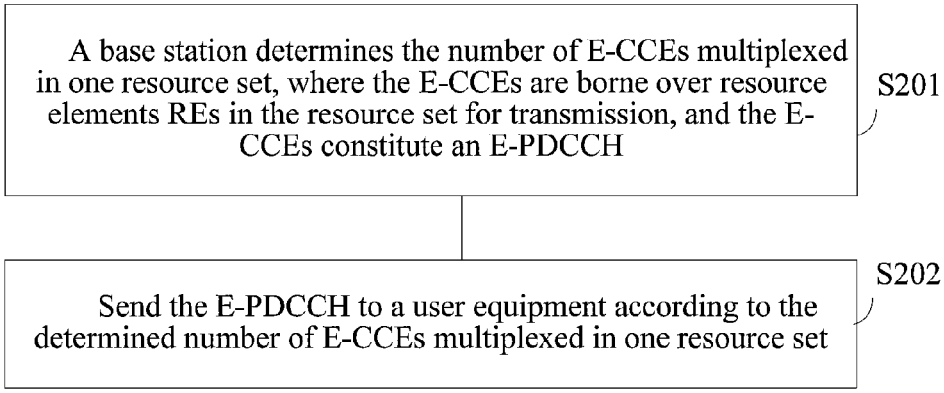
FIG. 3 is a schematic flowchart of another method for mapping control channel resources according to an embodiment of the present invention.

Another embodiment of the present invention provides a method for mapping control channel resources. As shown in FIG. 3, the method includes the following steps:

S201: A base station determines the number of E-CCEs multiplexed in one resource set, where the E-CCEs are borne over resource elements REs for transmission in the resource set, and the E-CCEs constitute an E-PDCCH.

S202: Send the E-PDCCH to a user equipment according to the determined number of E-CCEs multiplexed in one resource set.

The number of E-CCEs multiplexed in one RB pair may be set according to the total number of REs in the RB pair that are used for sending the E-PDCCH.

Exemplarily, the number of REs in the RB pair that are capable of sending the E-PDCCH corresponds to a value level group in Table 1, based on which the corresponding number of E-CCEs is determined. It is assumed that the actual number of REs in one RB pair that are capable of sending the E-PDCCH is L. As shown in Table 1, the number of E-CCEs multiplexed in one RB pair N and the number of REs occupied by each E-CCE M are determined according to the level group to which the value of belongs L.

When $l_1 \leq L < l_2$, L corresponds to the value level group in the first row, and in this case, according to the first row in Table 1, the value of N is $n_1$, and the value of M is $m_1$. When $l_3 \leq L < l_4$, L corresponds to the value level group in the third row, the value of N is $n_3$, and the value of M is $m_3$, and so on.

TABLE 1

| L | N | M |
|---|---|---|
| $l_1 \leq L < l_2$ | $n_1$ | $m_1$ |
| $l_2 \leq L < l_3$ | $n_2$ | $m_2$ |
| $l_3 \leq L < l_4$ | $n_3$ | $m_3$ |
| ... | ... | ... |

In one embodiment, N and M may be determined by using the following method: When the total number of REs in one resource set that are used for sending the E-PDCCH is L, the number of E-CCEs multiplexed in one resource set is N, and N includes at least two values, at least two first values are obtained by rounding down a quotient of L divided by N for the value of L and each value of N, and a first value of the at least two first values that is closest to a second value is selected as the number of REs occupied by the E-CCE M. Alternatively, the second value is 36.

Specifically, a value range of the number of available REs in each RB pair L is determined, and a value range of N is determined. For example, in this embodiment, the value of N may be 1, 2, 3, or 4, and may be separately represented by Ni, where i=1, 2, 3, or 4. The values of Ni are traversed for a certain value of L, the value of Mi is obtained according to a formula $$M_i = \left\lfloor \frac{L}{N_i} \right\rfloor,$$

and then the value of i is determined according to a formula $$i = \arg\min_i |M_i - 36|,$$

where the value of Ni may be N1=1, N2=2, N3=3, or N4=4. The formula $i = \arg\min_i |M_i - 36|$ represents the value of i that is determined according to the values of i and the value of Mi when the value of Mi is closest to 36. In one embodiment, in addition to 36, other values such as 35 may also be taken.

The value of Ni can be determined after the value of i is determined, that is, after the number of E-CCEs in a RB pair is determined, the corresponding size Mi of the E-CCEs is obtained according to $$M_i = \left\lfloor \frac{L}{N_i} \right\rfloor.$$

The above calculation results may be expressed in the form of a table as follows:

| L | N | M |
|---|---|---|
| L < 48 | 1 | L |
| 48 ≤ L < 87 | 2 | $\lfloor L/2 \rfloor$ |
| 87 ≤ L < 125 | 3 | $\lfloor L/3 \rfloor$ |
| 125 ≤ L | 4 | $\lfloor L/4 \rfloor$ |

Therefore, the determining the number of REs occupied by the E-CCEs M may be:

when the total number of REs in one resource set that are used for sending the E-PDCCH is L, the number of E-CCEs multiplexed in one resource set is N, and N includes at least two values, determining a value of N according to a mapping between the value of L and the value of N, and rounding down a quotient of the value of L divided by the value of N to obtain the number of REs occupied by the E-CCEs M.

Both the base station and the user equipment may determine M by using the method described in this embodiment.

Alternatively, it is still assumed that the number of REs in one RB pair that are capable of sending the E-PDCCH is L, the number N of E-CCEs multiplexed in one RB pair is determined according to a level group to which the value of L belongs, and the number of REs occupied by the E-CCEs M is derived according to L and the number of E-CCEs N.

The value of N may be determined first according to the value range of L, and as shown in Table 2, the base station sets a mapping between L and N. In this embodiment, the values in Table 2 are merely used as examples for description, and the present invention is not limited thereto. For example, when L=98, N=3 can be obtained according to the mapping in Table 2, and therefore three E-CCEs are multiplexed in one RB pair. The number of REs occupied by the E-CCEs may be: 98−32×3=2, and therefore two REs remain. The two REs may be allocated to one or two of the remaining two E-CCEs, may not be allocated to any of them, or may be allocated for bearing and transmitting other information, according to a preset rule, for example, according to information to be scheduled required by the E-CCEs, including allocation of resources, transmission block size, a modulation-coding mode, transmission rank and precoding matrix information, and the like.

TABLE 2

| L | N |
|---|---|
| 0 ≤ L < 24 | 0 |
| 24 ≤ L < 48 | 1 |
| 48 ≤ L < 80 | 2 |
| 80 ≤ L < 120 | 3 |
| 120 ≤ L | 4 |

Further, setting the number of E-CCEs multiplexed in one RB pair according to the total number of REs in one RB pair that are used for sending the E-PDCCH may be known to both the base station and the user equipment in advance, or may be set by the them through negotiation during communication.

It should be noted that, parameters in Table 2 are merely used as examples for description, and the present invention is not limited thereto.

Specifically, the base station may further send a notification to the user equipment, where the notification is used for indicating the number of E-CCEs multiplexed in one RB pair to the user equipment.

Further, the notification may be sent through high-layer signaling or physical layer signaling.

According to the method for mapping control channel resources provided in this embodiment of the present invention, a base station sends an E-PDCCH to a user equipment according to the determined number of E-CCEs multiplexed in one resource set. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

Figure 4:
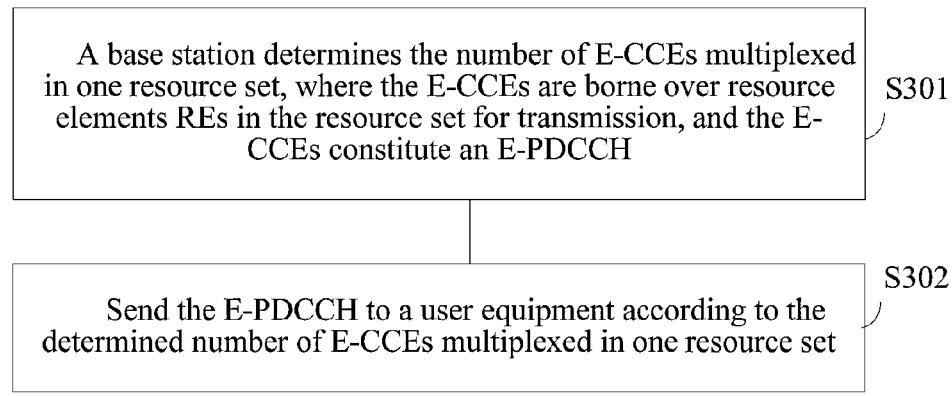
FIG. 4 is a schematic flowchart of still another method for mapping control channel resources according to an embodiment of the present invention.

Still another embodiment of the present invention provides a method for mapping control channel resources. As shown in FIG. 4, the method includes the following steps:

S301: A base station determines the number of E-CCEs multiplexed in one resource set, where the E-CCEs are borne over resource elements REs for transmission in the resource set, and the E-CCEs constitute an E-PDCCH.

S302: Send the E-PDCCH to a user equipment according to the determined number of E-CCEs multiplexed in one resource set.

The number of E-CCEs multiplexed in one RB pair N is set according to the total number of REs in one RB pair L that are used for sending the E-PDCCH and a preset number of REs occupied by E-CCEs M.

It should be noted that, the base station sets the number of E-CCEs multiplexed in one RB pair N according to the actual number of REs in the RB pair that are used for sending the E-PDCCH L and the number of REs occupied by the E-CCEs M according to different system configurations and/or actual transmission conditions. For example, if the total number of REs in one RB pair that are used for sending the E-PDCCH is L, and the number of REs occupied by the E-CCEs is M, it is set that the number of E-CCEs multiplexed in one RB pair is a maximum integer not greater than L/M. This algorithm may either be set by the base station and the user equipment or may be set through negotiation during communication.

Exemplarily, it is assumed that the number of REs occupied by the E-CCEs is 36, the number of E-CCEs multiplexed in an RB pair N is calculated according to the actual number of available REs in one RB pair L. That is, $N=\lfloor L/36 \rfloor$. In this embodiment, the number of REs occupied by the E-CCEs and the calculation method are merely used as an example for description, and the present invention is not limited thereto.

Further, if L cannot be exactly divided by 36, E=L−N×36 REs remain and are not allocated to any E-CCE. The remaining L' REs may not transmit the E-PDCCH, may be allocated to one or more of the N E-CCEs, or may be allocated to other information. For example, when L=98, $N=\lfloor 98/36 \rfloor=2$, and L'=98−72=26; that is, 26 REs remain. In this case, the remaining 26 REs in the RB pair may be allocated to one or two E-CCEs, may not be allocated to any E-CCE, or may be allocated for transmitting other information.

It should be noted that, the base station may send a notification to the user equipment, where the notification is used for indicating the number of E-CCEs multiplexed in one RB pair to the user equipment. Further, the notification may be sent through high-layer signaling or physical layer signaling.

According to the method for mapping control channel resources provided in this embodiment of the present invention, a base station sends an E-PDCCH to a user equipment according to the determined number of E-CCEs multiplexed in one resource set. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

Figure 5:
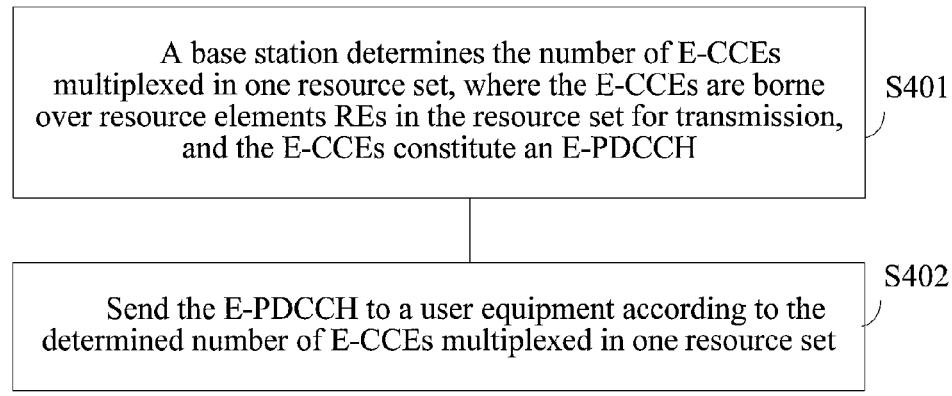
FIG. 5 is a schematic flowchart of still another method for mapping control channel resources according to an embodiment of the present invention.

Still another embodiment of the present invention provides a method for mapping control channel resources. As shown in FIG. 5, the method includes the following steps:

S401: A base station determines the number of E-CCEs multiplexed in one resource set, where the E-CCEs are borne over resource elements REs for transmission in the resource set, and the E-CCEs constitute an E-PDCCH.

S402: Send the E-PDCCH to a user equipment according to the determined number of E-CCEs multiplexed in one resource set.

The number of E-CCEs multiplexed in one RB pair is set according to a system configuration and/or an actual transmission condition, for example, one or more of a subframe type of a subframe where the E-PDCCH is located, the number of OFDM symbols occupied by a PDCCH, CRS reference signal configuration, CSI-RS reference signal configuration, DMRS reference signal configuration, and the number of data transmission layers.

The system configuration includes: at least one of the subframe type, the number of OFDM symbols occupied by a PDCCH, CRS (Cell-specific Reference Signal, cell-specific reference signal) configuration, and CSI-RS (Channel State Information—Reference Signal, channel state information—reference signal) configuration. The actual transmission condition includes: at least one of DMRS (Demodulation Reference Signal, demodulation reference signal) configuration and the number of data transmission layers.

The determining, according to a subframe type of a subframe where the E-PDCCH is located, the number of E-CCEs multiplexed in one resource set includes:
  when a physical downlink control channel PDCCH and an enhanced physical downlink control channel E-PDCCH are sent to the user equipment, and the PDCCH and the E-PDCCH are multiplexed in one subframe:
  determining, according to whether the subframe is a special subframe, an ordinary subframe, or an MBSFN subframe, the number of E-CCEs multiplexed in one resource set; or
  determining, according to whether the subframe is a time division duplex TDD subframe or a frequency division duplex FDD subframe, the number of E-CCEs multiplexed in one resource set.

Exemplarily, for example, in one RB pair, a PDCCH and various reference signals (Reference signal, RS) occupy different REs, leading to a great difference between the remaining numbers of available REs, where the RSs include a DMRS, a CRS and a CSI-RS. In addition, there are also many factors influencing the system configuration of available REs in one RB pair. For example, the number n of OFDM symbols occupied by the PDCCH has different values, where the value of n may be 0, 1, 2, 3 or 4; the number of CRS ports may be configured to 1, 2, or 4 so as to respectively occupy 8, 16, or 24 REs in a subframe; and if the number of CSI-RS ports is configured to 1, 2, 4, or 8, 1, 2, 4, or 8 REs are respectively occupied in a subframe. The number of silent (Zero Power CSI-RS) REs that do not send any signal is 4×I so as to avoid interfering with a CSI-RS transmission position in a neighboring cell, where I=0, 1, 2, . . . , 16. There are also many factors influencing actual transmission of available REs in one RB pair, for example, the number of REs occupied by the DMRS includes two cases: 12 and 24. Therefore, the number of REs in one RB pair that are available for transmitting the E-PDCCH varies with the system configuration and actual transmission condition. The above description is merely exemplary, persons skilled in the art may select influencing factors according to the actual transmission condition of the system, and this embodiment of the present invention is not limited thereto.

It should be noted that, on an actual system, although there are many factors influencing the system configuration and actual transmission condition, a mapping between the value of each influencing factor and the value of the number of E-CCEs N may be obtained and listed through experimental data comparison or based on the experience of persons skilled in the art. The mapping may be preset and is known to both the base station and the user equipment or may be obtained through negotiation between the two during communication.

Exemplarily, the base station correspondingly sets the number of E-CCEs according to the subframe type and the number of OFDM symbols occupied by the PDCCH in the system configuration. It should be noted that, the two system configurations provided in this embodiment, that is, the subframe type and the number of OFDM symbols occupied by the PDCCH, are merely used as examples for description, and the present invention is not limited thereto.

There are two subframe types: normal cyclic prefix (Normal cyclic prefix) subframe and extended cyclic prefix (Extended cyclic prefix) subframe. The number of OFDM symbols occupied by the PDCCH may be 0, 1, 2, 3, or 4. As shown in Table 3, the numbers of E-CCEs corresponding to different subframe types and different numbers of OFDM symbols occupied by the PDCCH may be directly obtained from the table.

For example, when the subframe type is normal cyclic prefix subframe, if the number of OFDM symbols occupied by the PDCCH is 0, the number of E-CCEs multiplexed in one RB pair is 4; when the subframe type is extended cyclic prefix subframe, if the number of OFDM symbols occupied by the PDCCH is 2, the number of E-CCEs multiplexed in one RB pair is 2.

TABLE 3

| Cyclic Prefix Type | The Number of PDCCH OFDM Symbols | N |
|---|---|---|
| Normal Cyclic Prefix Subframe | 0 | 4 |
| | 1 | 3 |
| | 2 | 3 |
| | 3 | 2 |
| | 4 | 2 |
| Extended Cyclic Prefix Subframe | 0 | 4 |
| | 1 | 3 |
| | 2 | 2 |

It should be noted that, corresponding data in Table 3 provided in this embodiment is merely used as an example for description, and the present invention is not limited thereto.

According to the method for mapping control channel resources provided in this embodiment of the present invention, a base station sends an E-PDCCH to a user equipment according to the determined number of E-CCEs multiplexed in one resource set. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

Still another embodiment of the present invention provides a method for mapping control channel resources. As shown in FIG. 6, the method includes the following steps:

S501: Determine the number of E-CCEs multiplexed in one resource set, where the E-CCEs are borne over resource elements REs for transmission in the resource set, and the E-CCEs constitute an enhanced physical downlink control channel E-PDCCH.

S502: Receive, according to the determined number of E-CCEs multiplexed in one resource set, the E-PDCCH sent by a base station.

It should be noted that, the user equipment may further determine, according to a received notification, the number of E-CCEs multiplexed in one RB pair, and this embodiment provides a method for determining, by the user equipment, the number of E-CCEs based on a known policy.

Exemplarily, the user equipment may determine, according to the total number of REs in one RB pair that are used for sending the E-PDCCH, the number of E-CCEs multiplexed in one RB pair so as to determine the number of E-CCEs constituting an E-PDCCH. For example, the number of E-CCEs multiplexed in one RB pair can be found correspondingly in a preset level table showing the relationship between the total number and the value level.

Further, when the user equipment obtains that the total number of REs in one RB pair that are used for sending the E-PDCCH is L, and the number of REs occupied by each E-CCE is M, the user equipment calculates L/M and determines that the number of E-CCEs multiplexed in one RB pair is a maximum integer not greater than L/M. If L is not exactly divided by M, the remaining REs, the number of which is the remainder, are added or not added to one or more E-CCEs according to the scheduling demand of the E-CCEs, or it is determined that the remaining REs transmit other information, or the remaining REs are added or not added to the E-CCEs according to other preset rules of the system, or it is determined that the remaining REs are used to transmit other information.

Alternatively, the user equipment may further obtain the number of E-CCEs multiplexed in one RB pair according to a known system configuration and/or actual transmission condition based on a set rule. For example, if the system configuration and/or actual transmission condition includes the subframe type multiplexed by the E-PDCCH and the number of OFDM symbols occupied by the PDCCH, the number of E-CCEs multiplexed in one RB pair may be found correspondingly in a table that is established based on experimental and statistic results of persons skilled in the art.

In one embodiment, the number of E-CCEs multiplexed in one resource set is determined according to a system configuration and/or an actual transmission condition.

The determining, according to a system configuration and/or an actual transmission condition, the number of E-CCEs multiplexed in one resource set includes:

determining, according to at least one of a subframe type of a subframe where the E-PDCCH is located, the number of orthogonal frequency division multiplexing OFDM symbols occupied by a PDCCH, cell-specific reference signal CRS reference signal configuration, channel state information—reference signal CSI-RS reference signal configuration, demodulation reference signal DMRS reference signal configuration, and the number of data transmission layers, the number of E-CCEs multiplexed in one resource set.

The determining, according to a subframe type of a subframe where the E-PDCCH is located, the number of E-CCEs multiplexed in one resource set includes:

when a physical downlink control channel PDCCH and an enhanced physical downlink control channel E-PDCCH that are sent by the base station are received, and the PDCCH and the E-PDCCH are multiplexed in one subframe:

determining, according to whether the subframe is a special subframe, an ordinary subframe, or an MBSFN subframe, the number of E-CCEs multiplexed in one resource set; or determining, according to whether the subframe is a time division duplex TDD subframe or a frequency division duplex FDD subframe, the number of E-CCEs multiplexed in one resource set.

It should be noted that, because the number of E-CCEs in a subframe sent by the base station is determined by the user equipment by using a policy known to both the user equipment and the base station or through negotiation during communication, the method for determining the number of E-CCEs is the same as the dynamic setting method of the base station. Therefore, no further details are provided herein.

According to the method for mapping control channel resources provided in this embodiment of the present invention, a user equipment receive an E-PDCCH and obtains, according to the E-PDCCH, the determined number of E-CCEs multiplexed in one resource set. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

An embodiment of the present invention provides a base station 60. As shown in FIG. 7, the base station 60 includes a determining unit 601 and a sending unit 602.

The determining unit 601 is configured to determine the number of E-CCEs multiplexed in one resource set, where the E-CCEs are borne over REs for transmission in the resource set, and the E-CCEs constitute an E-PDCCH.

Exemplarily, the determining unit 601 may set the number of E-CCEs according to the total number of REs in one RB pair that are used for sending the E-PDCCH according to different system configurations and/or actual transmission conditions. For example, the determining unit 601 may set the number of E-CCEs multiplexed in one RB pair according to the number of E-CCEs that corresponds to the value level of the total number in a known table. The specific setting method is described in detail in the above embodiments, and therefore no further details are provided herein.

Alternatively, the determining unit 601 is configured to: when the number of REs in one RB pair that are used for sending the E-PDCCH is L, and the number of REs occupied by the E-CCEs is M, set the number of E-CCEs constituting an E-PDCCH to a maximum integer not greater than L/M; and when there is a remainder, set REs, the number of which is the remainder, into one or more E-CCEs, or use the REs, the number of which is the remainder, to bear other information according to the scheduling demand of the E-CCEs. The specific setting method is described in detail in the above method embodiments, and therefore no further details are provided herein.

Alternatively, the determining unit 601 sets the number of E-CCEs multiplexed in one RB pair according to one or more of a subframe type of a subframe multiplexed by the E-PDCCH, the number of OFDM symbols occupied by a PDCCH, CRS reference signal configuration, CSI-RS reference signal configuration, DMRS reference signal configuration, and the number of data transmission layers. For example, according to whether the subframe type multiplexed by the E-PDCCH is normal cyclic prefix subframe or extended prefix cyclic subframe, and the number of OFDM symbols occupied by the PDCCH, for example, 0 to 4 OFDM symbols are occupied in the normal cyclic prefix subframe or 0 to 2 OFDM symbols are occupied in the extended cyclic subframe, the number of E-CCEs multiplexed in one RB pair is correspondingly set based on experimental and statistic results of persons skilled in the art.

The sending unit 602 is configured to send the E-PDCCH to a user equipment according to the number of E-CCEs multiplexed in one resource set that is determined by the determining unit 601.

It should be noted that, the sending unit 602 is further configured to send a PDSCH and a corresponding PDCCH and E-PDCCH, where the PDSCH, the PDCCH, and the E-PDCCH are multiplexed in one subframe.

The determining unit 601 is specifically configured to determine, according to whether the subframe is a special subframe, an ordinary subframe, or an MBSFN subframe, the number of E-CCEs multiplexed in one resource set; or determine, according to whether the subframe is a time division duplex TDD subframe or a frequency division duplex FDD subframe, the number of E-CCEs multiplexed in one resource set; and the sending unit 602 is specifically configured to send the PDCCH and the E-PDCCH to the user equipment according to the number of E-CCEs multiplexed in one resource set that is determined by the determining unit, where the PDCCH and the E-PDCCH are multiplexed in one subframe.

Further, the sending unit 603 may further send a notification to the user equipment to indicate the number of E-CCEs multiplexed in one RB pair to the user equipment, where the notification may be sent through high-layer signaling or physical layer signaling.

The base station 60 may work by using the method provided in the above embodiments, and the working method is the same as the method provided in the embodiments. Therefore, no further details are provided herein.

According to the base station provided in this embodiment of the present invention, the base station sends an E-PDCCH to a user equipment according to the determined number of E-CCEs multiplexed in one resource set. The user equipment receives the E-PDCCH and obtains the determined number of E-CCEs multiplexed in one resource set according to the E-PDCCH. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

An embodiment of the present invention provides a user equipment 70. As shown in FIG. 8, the user equipment 70 includes a determining unit 701 and a receiving unit 702.

The determining unit 701 is configured to determine the number of E-CCEs multiplexed in one resource set, where the E-CCEs are borne over resource elements REs for transmission in the resource set, and the E-CCEs constitute an enhanced physical downlink control channel E-PDCCH.

Further, the receiving unit 702 is further configured to receive a PDSCH and a corresponding PDCCH and E-PDCCH sent by the base station 60, where the PDSCH, the PDCCH, and the E-PDCCH are multiplexed in one subframe.

The receiving unit 702 is configured to receive, according to the number of E-CCEs multiplexed in one resource set that is determined by the determining unit 701, the enhanced physical downlink control channel E-PDCCH sent by a base station.

It should be noted that, this embodiment is described through an example where the resource set is an RB pair, but the present invention is not limited thereto.

Exemplarily, the determining unit 701 is specifically configured to calculate, according to the total number of REs in one RB pair L that are used for sending the E-PDCCH, a value of the number of E-CCEs multiplexed in one RB pair based on the corresponding position of the value of L in a known table, and determine the value as the number of E-CCEs.

Alternatively, the determining unit 701 is configured to: when the total number of REs in one RB pair that are used for sending the E-PDCCH is L and the number of REs occupied by the E-CCEs is M, determine that the number of E-CCEs constituting an E-PDCCH is a maximum integer not greater than L/M.

Alternatively, the determining unit 701 correspondingly obtains the number of E-CCEs multiplexed in one RB pair according to one or more of a subframe type of a subframe multiplexed by the E-PDCCH, the number of OFDM symbols occupied by a PDCCH, CRS reference signal configuration, CSI-RS reference signal configuration, DMRS reference signal configuration, and the number of data transmission layers. For example, if the subframe type multiplexed by the E-PDCCH is extended cyclic prefix subframe, and the number of OFDM symbols occupied by the PDCCH is 1, corresponding data 3 in a known table is the number of E-CCEs multiplexed in one RB pair.

The determining unit 701 is specifically configured to determine, according to at least one of a subframe type of a subframe where the E-PDCCH is located, the number of orthogonal frequency division multiplexing OFDM symbols occupied by a PDCCH, cell-specific reference signal CRS reference signal configuration, channel state information— reference signal CSI-RS reference signal configuration, demodulation reference signal DMRS reference signal configuration, and the number of data transmission layers, the number of E-CCEs multiplexed in one resource set.

The determining unit 701 is specifically configured to determine, according to whether the subframe is a special subframe, an ordinary subframe, or an MBSFN subframe, the number of E-CCEs multiplexed in one resource set; or determine, according to whether the subframe is a time division duplex TDD subframe or a frequency division duplex FDD subframe, the number of E-CCEs multiplexed in one resource set; and the receiving unit 702 is specifically configured to receive, according to the number of E-CCEs multiplexed in one resource set that is determined by the determining unit 701, a physical downlink control channel PDCCH and the enhanced physical downlink control channel E-PDCCH that are sent by the base station, where the PDCCH and the E-PDCCH are multiplexed in one subframe.

It should be noted that, because the policy used by the user equipment 70 to determine the number of E-CCEs is known to both the base station 60 and the user equipment 70 in advance or negotiated during communication, no matter what policy is used by the base station 60 for setting, the user equipment 70 determines the number of E-CCEs according to the same policy. The method is described in detail in the corresponding method embodiments, and therefore no further details are provided herein.

The user equipment 70 may work by using the method provided in the above embodiments, and the working method is the same as the method provided in the embodiments. Therefore, no further details are provided herein.

According to the user equipment provided in the embodiment of the present invention, the user equipment receives an E-PDCCH sent by a base station, and obtains, according to the E-PDCCH, the determined number of E-CCEs multiplexed in one resource set. Different from the prior art where a fixed number of E-CCEs are used, the base station dynamically sets the number of E-CCEs according to actual conditions, and the user equipment also obtains the number of E-CCEs, so that the number of REs occupied in one resource set by E-CCEs is close to the number of REs occupied by CCEs of a PDCCH. This ensures stable performance of the E-CCEs, thereby improving the accuracy of receiving the E-PDCCH by the user equipment.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium may be any medium that is capable of storing program codes, such as a ROM, a RAM, a magnetic disk or an optical disk.

The foregoing descriptions are merely specific embodiments of the present invention, but are not intended to limit the protection scope of the present invention. Various variations and modifications that can be easily thought of by persons skilled in the art within the technical scope disclosed by the present invention shall fall within the protection scope of the present invention. Therefore, the protection scope of the present invention is subject to the protection scope of the appended claims.

What is claimed is:

1. A method for mapping control channel resources, the method comprising:
    determining, according to whether a subframe is a special subframe or an ordinary subframe and whether the subframe is a normal cyclic prefix subframe or an extended cyclic prefix subframe, a number of enhanced control channel elements (E-CCEs) multiplexed in one resource set, wherein the E-CCEs are borne over resource elements (REs) for transmission in the resource set, and the E-CCEs constitute the enhanced physical downlink control channel (E-PDCCH);
    determining, according to the number of the E-CCEs multiplexed in one resource set N, the number of REs occupied by the E-CCEs M;
    sending the E-PDCCH to a user equipment according to the determined number of E-CCEs multiplexed in the one resource set;
    wherein the number of the E-CCEs multiplexed in one resource set N comprises at least two values; and
    wherein determining, according to the number of the E-CCEs multiplexed in one resource set N, the number of REs occupied by the E-CCEs M comprises:
        obtaining at least two first values by rounding down a quotient of L divided by N for the value of L and each value of N, and
        selecting a first value that is closest to 36 from the at least two first values as the number of REs occupied by the E-CCEs M, where L is the total number of REs in one resource set for sending the E-PDCCH.

2. The method according to claim 1, further comprising:
    when a physical downlink control channel (PDCCH) and an enhanced physical downlink control channel (E-PDCCH) are sent to the user equipment, and the PDCCH and the E-PDCCH are multiplexed in one subframe:
        determining, according to whether the subframe is a time division multiplexing subframe or a frequency division multiplexing subframe, the number of E-CCEs multiplexed in one resource set.

3. The method according to claim 1, further comprising:
    sending a notification indicating the number of E-CCEs multiplexed in one resource set to the user equipment.

4. The method according to claim 1, wherein the number of enhanced control channel elements (E-CCEs) multiplexed in one resource set is further determined according to at least one of a demodulation reference signal (DMRS) reference signal configuration, and a number of data transmission layers.

5. A method for mapping control channel resources, the method comprising:
    determining, according to whether a subframe is a special subframe or an ordinary subframe and whether the subframe is a normal cyclic prefix subframe or an extended cyclic prefix subframe, a number of enhanced control channel elements (E-CCEs) multiplexed in one resource set, wherein the E-CCEs are borne over resource elements (REs) for transmission in the resource set, and the E-CCEs constitute the enhanced physical downlink control channel (E-PDCCH);
    determining, according to the number of the E-CCEs multiplexed in one resource set N, the number of REs occupied by the E-CCEs M;
    receiving the E-PDCCH sent by a base station according to the determined number of E-CCEs multiplexed in one resource set;
    wherein the number of the E-CCEs multiplexed in one resource set N comprises at least two values comprises at least two values; and
    wherein determining, according to the number of the E-CCEs multiplexed in one resource set N, the number of REs occupied by the E-CCEs M comprises:
        obtaining at least two first values by rounding down a quotient of L divided by N for the value of L and each value of N, and
        selecting a first value that is closest to 36 from the at least two first values as the number of REs occupied by the E-CCEs M, where L is the total number of REs in one resource set for sending the E-PDCCH.

6. The method according to claim 5, further comprising:
    when a physical downlink control channel (PDCCH) and an enhanced physical downlink control channel (E-PDCCH) that are sent by the base station are received, and the PDCCH and the E-PDCCH are multiplexed in one subframe:
        determining, according to whether the subframe is a time division multiplexing subframe or a frequency division multiplexing subframe, the number of E-CCEs multiplexed in one resource set.

7. The method according to claim 5, wherein the number of enhanced control channel elements (E-CCEs) multiplexed in one resource set is further determined according to at least one of a demodulation reference signal (DMRS) reference signal configuration, and a number of data transmission layers.

8. A base station, comprising:
a processor, configured to:
determine, according to whether a subframe is a special subframe or an ordinary subframe and whether the subframe is a normal cyclic prefix subframe or an extended cyclic prefix subframe, a number of enhanced control channel elements (E-CCEs) multiplexed in one resource set, wherein the E-CCEs are borne over resource elements (REs) for transmission in the resource set, and the E-CCEs constitute an enhanced physical downlink control channel (E-PDCCH),
determine, according to the number of the E-CCEs multiplexed in one resource set N, the number of REs occupied by the E-CCEs M, wherein the number of the E-CCEs multiplexed in one resource set N comprises at least two values,
obtain at least two first values by rounding down a quotient of L divided by N for the value of L and each value of N, and select a first value that is closest to 36 from the at least two first values as the number of REs occupied by the E-CCEs M, where L is the total number of REs in one resource set for sending the E-PDCCH to a user equipment; and
a transmitter, configured to send the E-PDCCH to the user equipment according to the number of E-CCEs multiplexed in one resource set that is determined by the processor.

9. The base station according to claim 8, wherein:
the processor is configured to:
determine, according to whether the subframe is a time division multiplexing subframe or a frequency division multiplexing subframe, the number of E-CCEs multiplexed in one resource set; and
the transmitter is configured to send the PDCCH and the E-PDCCH to the user equipment according to the number of E-CCEs multiplexed in one resource set that is determined by the processor, wherein the PDCCH and the E-PDCCH are multiplexed in one subframe.

10. The base station according to claim 8, wherein the processor is configured to determine the number of enhanced control channel elements (E-CCEs) multiplexed in one resource set according to at least one of a demodulation reference signal (DMRS) reference signal configuration, and a number of data transmission layers.

11. A user equipment, comprising:
a processor, configured to:
determine, according to whether a subframe is a special subframe or an ordinary subframe and whether the subframe is a normal cyclic prefix subframe or an extended cyclic prefix subframe, a number of enhanced control channel elements (E-CCEs) multiplexed in one resource set, wherein the E-CCEs are borne over resource elements (REs) for transmission in the resource set, and the E-CCEs constitute an enhanced physical downlink control channel (E-PDCCH),
determine, according to the number of the E-CCEs multiplexed in one resource set N, the number of REs occupied by the E-CCEs M, wherein the number of the E-CCEs multiplexed in one resource set N comprises at least two values,
obtain at least two first values by rounding down a quotient of L divided by N for the value of L and each value of N, and
select a first value that is closest to 36 from the at least two first values as the number of REs occupied by the E-CCEs M, where L is the total number of REs in one resource set for sending an enhanced physical downlink control channel (E-PDCCH); and
a receiver, configured to receive, according to the number of E-CCEs multiplexed in one resource set that is determined by the processor, the E-PDCCH sent by a base station.

12. The user equipment according to claim 11, wherein:
the processor is configured to:
determine, according to whether the subframe is a time division multiplexing subframe or a frequency division multiplexing subframe, the number of E-CCEs multiplexed in one resource set; and
the receiver is configured to receive, according to the number of E-CCEs multiplexed in one resource set that is determined by the processor, a physical downlink control channel (PDCCH) and the enhanced physical downlink control channel E-PDCCH that are sent by the base station, wherein the PDCCH and the E-PDCCH are multiplexed in one subframe.

13. The user equipment according to claim 11, wherein the processor is configured to determine the number of enhanced control channel elements (E-CCEs) multiplexed in one resource set according to at least one of a demodulation reference signal (DMRS) reference signal configuration, and a number of data transmission layers.

14. A non-transitory computer readable storage medium, comprising computer program codes which when executed by a computer processor cause the computer processor to:
determine, according to whether a subframe is a special subframe or an ordinary subframe and whether the subframe is a normal cyclic prefix subframe or an extended cyclic prefix subframe, a number of enhanced control channel elements (E-CCEs) multiplexed in one resource set, wherein the E-CCEs are borne over resource elements (REs) for transmission in the resource set, and the E-CCEs constitute an enhanced physical downlink control channel (E-PDCCH);
determine, according to the number of the E-CCEs multiplexed in one resource set N, the number of REs occupied by the E-CCEs M;
send the E-PDCCH to a user equipment according to the determined number of E-CCEs multiplexed in the one resource set;
wherein the number of the E-CCEs multiplexed in one resource set N comprises at least two values; and
to determine, according to the number of the E-CCEs multiplexed in one resource set N, the number of REs occupied by the E-CCEs M, the computer program codes, when executed by the computer processor, cause the computer processor to:
obtain at least two first values by rounding down a quotient of L divided by N for the value of L and each value of N, and
select a first value that is closest to 36 from the at least two first values as the number of REs occupied by the E-CCEs M, where L is the total number of REs in one resource set for sending the E-PDCCH.

15. A non-transitory computer readable storage medium, comprising computer program codes which when executed by a computer processor cause the computer processor to:

determine, according to whether a subframe is a special subframe or an ordinary subframe and whether the subframe is a normal cyclic prefix subframe or an extended cyclic prefix subframe, a number of enhanced control channel elements (E-CCEs) multiplexed in one resource set, wherein the E-CCEs are borne over resource elements (REs) for transmission in the resource set, and the E-CCEs constitute an enhanced physical downlink control channel (E-PDCCH);

determine, according to the number of the E-CCEs multiplexed in one resource set N, the number of REs occupied by the E-CCEs M;

receive the E-PDCCH sent by a base station according to the determined number of E-CCEs multiplexed in one resource set;

wherein the number of the E-CCEs multiplexed in one resource set N comprises at least two values;

and to determine, according to the number of the E-CCEs multiplexed in one resource set N, the number of REs occupied by the E-CCEs M, the computer program codes, when executed by the computer processor, cause the processor to:

obtain at least two first values by rounding down a quotient of L divided by N for the value of L and each value of N, and selecting a first value that is closest to 36 from the at least two first values as the number of REs occupied by the E-CCEs M, where L is the total number of REs in one resource set for sending the E-PDCCH.

\* \* \* \* \*